No. 786,132. PATENTED MAR. 28, 1905.
G. MARCONI.
WIRELESS TELEGRAPHY.
APPLICATION FILED OCT. 13, 1903.
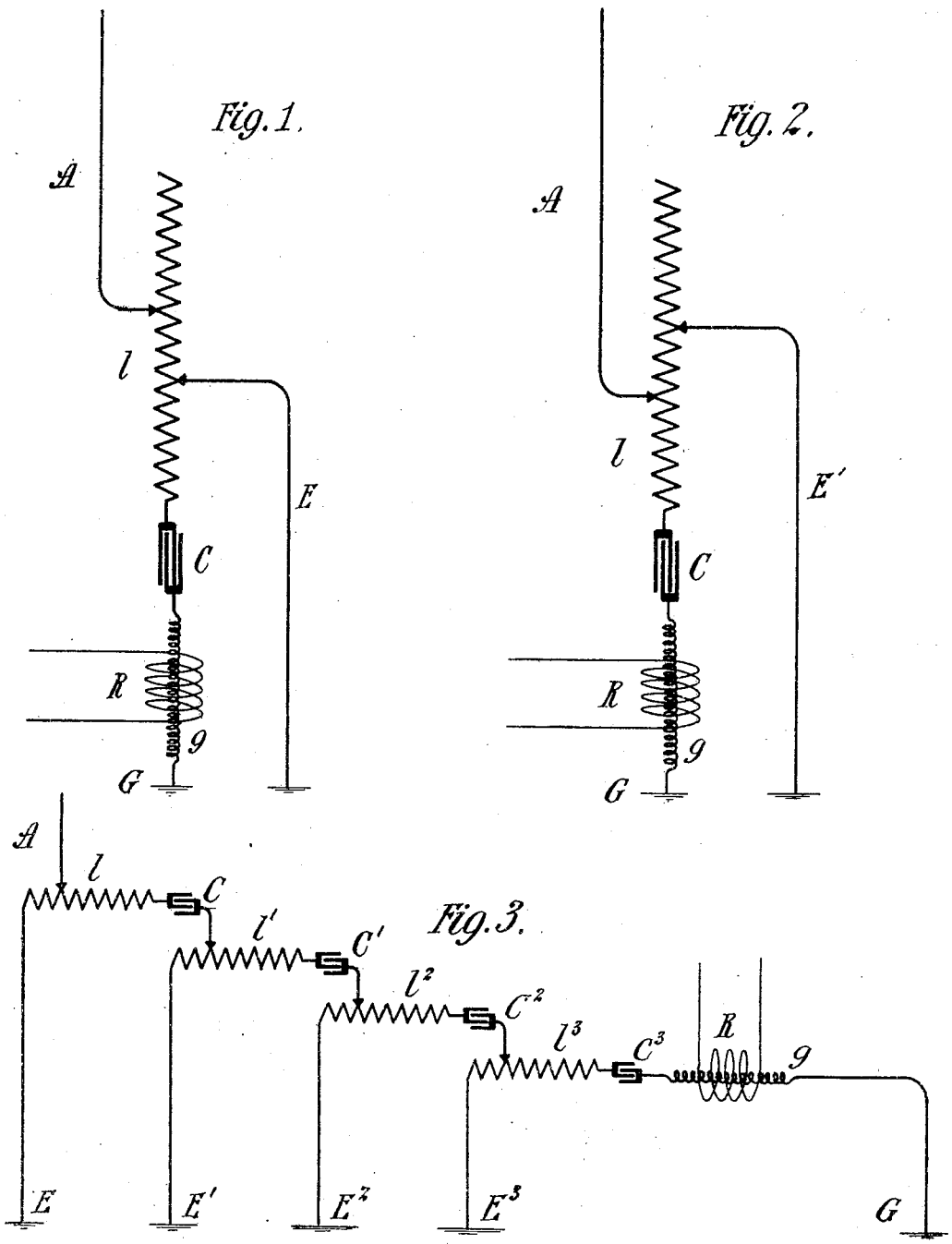

No. 786,132.

Patented March 28, 1905.

UNITED STATES PATENT OFFICE.

GUGLIELMO MARCONI, OF LONDON, ENGLAND, ASSIGNOR TO MARCONI'S WIRELESS TELEGRAPH COMPANY, LIMITED, A CORPORATION OF GREAT BRITAIN.

WIRELESS TELEGRAPHY.

SPECIFICATION forming part of Letters Patent No. 786,132, dated March 28, 1905.

Application filed October 13, 1903. Serial No. 176,844.

*To all whom it may concern:*

Be it known that I, GUGLIELMO MARCONI, a subject of the King of Italy, residing in the city of London, England, (and having a post-office address at 18 Finch Lane, in the said city of London,) have invented certain new and useful Improvements in Wireless Telegraphy, of which the following is a full and true description, reference being had to the accompanying drawings, which show diagrammatically three embodiments of my invention.

My invention relates to improvements in telegraphy through the natural media by means of electric waves, and especially to circuits forming part of a receiver by which tuned or syntonic effects can be obtained and the effects of natural disturbances, such as thunderstorms, upon the receiver are minimized.

According to my present invention an exposed aerial or elevated conductor is grounded by means of several connections of different inductance and capacity instead of by one, as has heretofore been the usual practice.

Referring to the accompanying diagrammatic drawings, Figure 1 shows one form of apparatus useful in carrying out my invention. Fig. 2 shows a second form of apparatus, and Fig. 3 shows a third form.

The most simple form of my invention is shown in Fig. 1, in which A represents the receiving-aerial adjustably connected to the inductance-coil $l$; C, a condenser connected to the inductance-coil; R, a suitable receiver or detector—such as the magnetic detector of my inventions described in a paper read by me before the Royal Society of London, on June 12, 1902, and which are described in *Electrical World and Engineer*, published at New York city, July 5 and 12, 1902, and also described and claimed in an application, Serial No. 132,974, filed November 28, 1902, for Letters Patent of the United States—connected to the condenser.

One terminal, $g$, of the detector is grounded at G, and another ground connection, E, which is preferably flexible or adjustable, is joined to the inductance $l$ at a certain point, the position of which is dependent upon the period of the electric wave radiated from the distant transmitting-station. This receiving system is syntonized or attuned to one particular frequency of electrical waves radiated from any one of a number of differently-attuned distant electric radiators in the following manner: The size of the condenser C is fixed, and the inductance $l$ is varied by adjusting its connection with the aerial until signals are received on the responder or detector R. Then by sliding the flexible or adjustable ground connection E along the inductance $l$ or otherwise a point is found at which, if a new ground connection is established, waves of the particular frequency radiated from a given distant transmitting-station from which it is desired to receive signals will be received and detected to the exclusion of signals transmitted from other stations radiating waves of different frequencies. I have discovered that this ground connection E may be made without weakening but rather strengthening the signals in the detector R.

The position of the ground connection E in the inductance $l$ is dependent upon the length of the wave to be detected. It should be connected at or near the node or point of no potential of the electric wave which it is desired to read or detect, and the detector R will then be unresponsive to electrical waves of frequencies other than that for which the system has been adjusted as described.

By means of this present invention a very sharp selectivity of signals is obtained and the troublesome effects of atmospheric electricity are largely or wholly eliminated.

In Fig. 2 is shown a modification of Fig. 1, the ground connection E of Fig. 1 being replaced by another at E' of Fig. 2, the position of which on the inductance $l$ being found similarly to the adjustment of E, as hereinbefore described.

Many extensions of the arrangements shown in Figs. 1 and 2 will readily suggest themselves.

By reference to Figs. 1 and 2 it will be seen that the receiving apparatus therein illustrated each comprises two associated circuits, one (an open circuit) including the aerial A, the conductor E, (or E',) and that portion of the inductance-coil *l* between the respective points of contact thereof with the aerial and the conductor and the second circuit (a closed circuit) including the responder or detector R, condenser C, conductor E, (or E',) and that portion of the inductance-coil between the condenser and the conductor E.

It is essential that a condenser shall be included in the so-called "closed circuit;" otherwise the apparatus will not properly operate, because if a condenser is omitted from said circuit that circuit cannot be tuned to respond to the proper wave period.

As stated, the flexible or adjustable ground connection E may be variably connected with or arranged to simultaneously include more or less of the turns of the inductance-coil in the two circuits referred to. Now when the conductor E is adjusted to a certain position (for instance, that shown in Fig. 1) and electromagnetic waves fall upon aerial A such waves will excite oscillations in the aerial, and if the time period of the open-circuit aerial plus the included turns of the inductance-coil is the same as that of the condenser C plus the turns of the inductance-coil included in circuit with said condenser and if this agrees with that of the waves incident the responder will be affected. If, however, waves of other period fall upon the aerial, there will be little or no sympathetic vibration excited in the condenser-circuit, and the responder will not be affected.

In Fig. 3 is shown one such extension, comprising a series of similar syntonic circuits, each in tune with the wave transmitted, the system being grounded at the nodal points E, E', E², E³, and G, which are determined by the periodicity of the wave transmitted. This arrangement gives a particularly sharp attunement and is especially adapted to eliminate the stray or extra signals caused by atmospheric disturbances.

While I have described and shown three embodiments of my invention, I do not desire to be understood as limiting my claims thereto. Obviously other modifications within the scope of my invention will readily suggest themselves to persons skilled in wireless telegraphy.

What I claim is—

1. At a receiving-station employed in wireless telegraphy, the combination of an open circuit containing an oscillation-receiving conductor and inductance in circuit therewith, and a closed oscillation-circuit containing inductance and a condenser, and an adjustable contact arranged to alter the inductance of the two circuits, substantially as described.

2. At a receiving-station employed in wireless telegraphy, the combination of an open circuit containing an oscillation-receiving conductor and inductance in circuit therewith, in combination with a closed oscillation-circuit containing a condenser and including a contact for adjustably including the inductance in both circuits, substantially as described.

3. At a receiving-station employed in wireless telegraphy, the combination of an open circuit containing an oscillation-receiving conductor and inductance in circuit therewith, in combination with a closed oscillation-circuit containing inductance and a condenser, an adjustable contact arranged to alter the inductance of the two circuits, and a receiving-circuit magnetically connected with the closed circuit, substantially as described.

4. At a receiving-station employed in wireless telegraphy, the combination of a receiver or responder earthed at one end and joined at the other end to a condenser and variable inductance in series, the free end of said inductance being earthed and also connected to an oscillation-receiving conductor having variable inductions in series with it, substantially as described.

5. At a receiving-station employed in wireless telegraphy, the combination of a receiver or responder earthed at one end and connected with a condenser and inductance joined in series, the free end of the inductance being earthed, and an oscillation-receiving conductor, adjustably connected with said inductance, substantially as described.

6. At a receiving-station employed in wireless telegraphy, the combination of an open oscillation-receiving circuit containing inductance, a closed oscillation-circuit containing inductance and a condenser, and means for altering the inductance of both of said circuits without altering the sum of the inductance of the two circuits, substantially as described.

GUGLIELMO MARCONI.

Witnesses:
 DELOS HOLDEN,
 WM. H. BERRIGAN.